(12) United States Patent
Grebel

(10) Patent No.: US 11,827,285 B2
(45) Date of Patent: Nov. 28, 2023

(54) DIFFUSER SYSTEM HAVING A PIVOTABLE DOWNFORCE-GENERATING BODY IN THE FLOW PATH, AND MOTOR VEHICLE HAVING A DIFFUSER SYSTEM

(71) Applicant: Röchling Automotive SE, Mannheim (DE)

(72) Inventor: Karsten Grebel, Bürstadt (DE)

(73) Assignee: Röchling Automotive SE, Mannheim (DE)

( * ) Notice: Subject to any disclaimer, the term of this patent is extended or adjusted under 35 U.S.C. 154(b) by 173 days.

(21) Appl. No.: 17/341,491

(22) Filed: Jun. 8, 2021

(65) Prior Publication Data

US 2021/0387685 A1 Dec. 16, 2021

(30) Foreign Application Priority Data

Jun. 15, 2020 (DE) ..................... 10 2020 115 689.8

(51) Int. Cl.
*B62D 35/02* (2006.01)
*B62D 37/02* (2006.01)

(52) U.S. Cl.
CPC ............. *B62D 35/02* (2013.01); *B62D 37/02* (2013.01)

(58) Field of Classification Search
CPC ...... B62D 35/00; B62D 35/02; B62D 35/002; B62D 35/005; B62D 37/00; B62D 37/02
See application file for complete search history.

(56) References Cited

U.S. PATENT DOCUMENTS 4,772,062 A 9/1988 Janssen et al.
9,469,355 B2 10/2016 Wolf
(Continued)

FOREIGN PATENT DOCUMENTS

CN 105857415 A * 8/2016 ........... B62D 35/005
DE 102008058993 A1 * 5/2010 ............. B62D 35/02
(Continued)

OTHER PUBLICATIONS

German Search Report for corresponding DE 10 2020 115 689.8 dated Jan. 13, 2021, 6 pgs.
(Continued)

*Primary Examiner* — Lori Lyjak
(74) *Attorney, Agent, or Firm* — Rankin, Hill & Clark LLP

(57) ABSTRACT

A diffusor system for a motor vehicle, including a diffuser duct, which extends along a virtual duct path and is traversable by flow in a flow direction, having at least one duct bounding surface which is curved about a diffuser curvature axis, the diffuser curvature axis forming an angle with the duct path, and including a downforce-generating body, which can pivot between two operating positions about a pivot axis, which is orthogonal to the duct path; in a cross-sectional plane, which is orthogonal to the pivot axis, the downforce-generating body having a profile that generates downforce in response to approach flow; in an activation operating position, a leading edge of the downforce-generating body, which is more proximate to the upstream longitudinal end of the diffuser duct, being at a greater distance from the curved duct bounding surface than in an inactivation operating position, which differs from the activation operating position; the pivot axis extends outside of the downforce-generating body.

17 Claims, 4 Drawing Sheets

(56) References Cited

U.S. PATENT DOCUMENTS

2017/0050684 A1    2/2017  Kim
2019/0039663 A1*   2/2019  Bray .................... B62D 35/02

FOREIGN PATENT DOCUMENTS

| DE | 102011103787 A1 |   | 12/2012 |           |
|----|-----------------|---|---------|-----------|
| DE | 102013101296 A1 | * | 8/2014  | B62D 35/007 |
| DE | 102013105843 A1 | * | 12/2014 | B62D 35/007 |
| FR | 2856974 A1      |   | 1/2005  |           |
| FR | 3045554 A1      | * | 6/2017  | B62D 35/005 |
| FR | 3089942 A1      | * | 6/2020  |           |

OTHER PUBLICATIONS

Espacenet Bibliographic data:DE 102011103787 (A1), Published Dec. 13, 2012, 1 pg.
Espacenet Bibliographic data:FR 2856974 (A1), Published Jan. 7, 2005, 1 pg.

* cited by examiner

US 11,827,285 B2

DIFFUSER SYSTEM HAVING A PIVOTABLE DOWNFORCE-GENERATING BODY IN THE FLOW PATH, AND MOTOR VEHICLE HAVING A DIFFUSER SYSTEM

This Application claims priority in German Patent Application DE 10 2020 115 689.8 filed on Jun. 15, 2020, which is incorporated by reference herein.

The present invention relates to a diffusor system for a motor vehicle, including a diffuser duct, which extends along a virtual duct path and is traversable by flow in a flow direction, having at least one duct bounding surface, which is curved about a diffuser curvature axis, the curvature axis forming an angle with the duct path, and including a downforce-generating body, which can pivot between two operating positions about a pivot axis which forms an angle, preferably a right angle, with the duct path; in a cross-sectional plane, which is orthogonal to the pivot axis, the downforce-generating body having a form which generates downforce in response to approach flow; in an activation operating position, a leading edge of the downforce-generating body, which is more proximate to the upstream longitudinal end of the diffuser duct, being at a greater distance from the curved duct bounding surface than in an inactivation operating position, which differs from the activation operating position.

BACKGROUND OF THE INVENTION

Such a diffusor device is known from the German Patent Application DE 10 2013 105 843 A1. The known diffuser system configured in the rear section of a motor vehicle has a profile body as the downforce-generating body, which is formed to have an airfoil profile shape; in the first instance, is translationally movable away from the vehicle floor and towards the same, and which, in the extended position where it is moved away from the vehicle floor, is rotatable about an axis of rotation that runs in the transverse direction of the vehicle. In response to approach flow, the airfoil profile aerodynamically generates downforce. By translationally approaching the vehicle floor and moving away therefrom, the downforce-generating body can thus be functionally deactivated, respectively activated. In the extended position, the aerodynamic effect of the diffuser system can be modified by rotating the downforce-generating body about the axis of rotation thereof. The diffuser system, together with the downforce-generating body, is thereby adjusted between a position of maximum downforce and a position of minimum drag in the area of the diffuser system.

Moreover, diffuser systems are known where the curvature of the curved duct bounding surface, which is substantially responsible for the desired downforce effect of a diffuser system, is variable, culminating in the reshaping of the duct bounding surface as a plane duct bounding surface. Such a diffuser system having a variably curved duct bounding surface is known as a front diffuser system, for example, in vehicle type 918 of the manufacturer Porsche. Modifying the curvature of the curved duct bounding surface enables the diffuser system to be switched on and off, so to speak.

The approach known from the German Patent Application DE 10 2013 105 843 A1 has the disadvantage of complex kinematics, which requires a translational and a rotational driving device. Because of this complex kinematics, the known diffuser system can only be used in the rear section of a vehicle, as described in the German Patent Application DE 10 2013 105 843 A1, where sufficient installation space is provided for accommodating the necessary driving devices.

The approach of the switchable front diffuser system known from Porsche 918 has the disadvantage of forces which are high in absolute value and are provided for switching the known diffuser system on and off since the curvature of the curved duct bounding surface is modified in at least one direction opposite the downforce generated by the diffuser system, so that, besides the material elasticity of the component having the curved duct bounding surface, modifying the curvature requires that the movement drive be able to overcome the downforce.

SUMMARY OF THE INVENTION

It is, therefore, an object of the present invention to provide an improved design for the diffuser system mentioned at the outset that will permit installation thereof in any desired locations of a motor vehicle.

The present invention achieves this objective by using the diffuser system mentioned at the outset, where the pivot axis additionally extends outside of the downforce-generating body.

By positioning the pivot axis outside of the downforce-generating body, the downforce-generating body is not only displaced rotationally in the diffuser duct, but is also moved translationally along a circular path defined by the distance of the pivot axis from the downforce-generating body. Thus, the downforce-generating body may be changed not only with respect to the angle of attack thereof relative to the air flow in the diffuser duct, rather, the location of the configuration thereof in the diffuser duct may also be modified within certain limits upstream and downstream. To ensure that the downforce-generating body is disposed in the diffuser duct in each of the two mentioned operating positions thereof, the pivot axis is preferably oriented orthogonally to the duct path.

Thus, a single drive suffices for adjusting the downforce-generating body between the mentioned operating positions, which are preferably end positions thereof. Moreover, the downforce-generating body is not displaced between the mentioned operating positions against the downforce generated by the diffuser system, so that the drive forces and torques required for displacing the downforce-generating body in the diffuser duct allow a small-dimensioned drive to suffice.

When the diffuser system is considered in a state whereby it is operationally disposed in a vehicle, the diffuser axis of curvature typically extends parallel to the pitch axis of the vehicle, i.e., parallel to a plane and horizontal reference ground on which the vehicle rests. At the upstream longitudinal end thereof, the curved duct bounding surface extends essentially parallel to the surrounding vehicle floor and curves away from the reference ground in the flow direction. The approach provided herein makes it possible for the downforce-generating body to be disposed in the inactivation operating position more proximately to the upstream longitudinal end of the diffuser duct, and thus, at the earliest possible stage, prevent an air flow along the portion of the duct bounding surface which curves away from the reference ground.

Similarly, in the activation operating position, the downforce-generating body may be disposed in a curved portion of the duct bounding surface, where it is able to be more effective than in a less curved region or in a region proximate to the upstream end of the diffuser duct that is virtually parallel to the reference ground.

For that reason, the downforce-generating body in the inactivation operating position is more proximate to the upstream end of the diffuser duct than in the activation operating position. It is likewise preferred that the downforce-generating body be situated in the activation operating position more proximately to the downstream end of the diffuser duct than to the upstream end thereof.

In the activation operating position, the downforce effect of the diffuser system is greater in absolute value than in the inactivation operating position where the downforce-generating body preferably virtually neutralizes the downforce effect of the diffuser system.

The location of the pivot axis is selected as a compromise between the maximum rotational change in the position of the downforce-generating body in the case of the pivot axis extending therethrough and the maximum translational displacement thereof in the case of the pivot axis being infinitely far therefrom. Both cases are merely theoretical borderline cases that the present application does not encompass.

Even if it basically suffices that the distance of the pivot axis from the downforce-generating body is so small that it passes through the diffuser duct, an advantageously substantial translational displacement of the downforce-generating body within the diffuser duct may thereby be achieved in the context of a still sufficient rotational position change, by the pivot axis extending outside of the diffuser duct. Moreover, such a design also facilitates the mounting of the pivot drive of the downforce-generating body, which may then be conveniently positioned outside of the diffuser duct at a distance from the vehicle floor and thus at a distance from the curved duct bounding surface.

It should be clarified at this point that, in both mentioned operating positions, the downforce-generating body is disposed in the diffuser duct, thus, in the case of an approach flow when the vehicle is in motion.

As a general principle, the downforce-generating body may be adjusted between the mentioned operating positions thereof by only one drive, even along a complicated movement path, with the assistance of a transmission, for instance, as well as with motion control by a sliding track. A preferred uncomplicated and thus inexpensive approach, which makes it possible to switch the diffuser system between a neutralized or at least minimal downforce effect and a maximum downforce effect, may thereby be achieved by the pivotability of the downforce-generating body about the pivot axis being the only movability of the downforce-generating body relative to the diffuser duct.

To be able to neutralize the downforce effect of the diffuser system in the inactivation operating position to the greatest possible extent, it is advantageous when the downforce-generating body is brought by the longitudinal end region thereof most proximate to the upstream longitudinal end of the diffuser duct, as proximately as possible to the curved duct bounding surface, for instance, to a gap dimension of less than 3 mm. In the inactivation operating position, it is especially preferred that the downforce-generating body rest by the longitudinal end region thereof, which is most proximate to the upstream longitudinal end of the diffuser duct, against the curved duct bounding surface. This not only ensures lower holding forces than when a gap is present and thus a circumflow of flow air around the downforce-generating body. Moreover, without additional components, it also ensures an inactivation operating position defined by a mechanical limit stop, thereby facilitating the control of the drive or making at least one separate mechanical motion-limiting stop superfluous.

Various embodiments are generally conceivable, on whose basis the downforce-generating body aerodynamically generates downforce in response to approach flow. For example, a downforce-generating body having a plane flow impingement surface, which is oriented at an angle about a pitch axis that is orthogonal to the direction of incident flow, may already aerodynamically generate a downforce. In the same way, a downforce-generating body having an incident flow surface, against which flow impinges during operation and which is curved about an axis of curvature that is orthogonal to the direction of incident flow, may aerodynamically generate a downforce. The downforce-generating body is preferably a profile body having an aerodynamically downforce generating airfoil profile as the previously mentioned shape. To achieve a greatest possible downforce effect at a specified incident flow, the downforce-generating body, preferably formed as a profile body having an airfoil profile, is circumflowed by an incident airflow in the activation operating position.

Due to the aerodynamically downflow generating form thereof, the downforce-generating body preferably has an airfoil profile form, preferably between the leading edge thereof, which is more proximate to the upstream longitudinal end of the diffuser duct, and the trailing edge thereof, which is more proximate to the downstream longitudinal end of the diffuser duct; an overpressure side having an overpressure surface wall, which is shorter in the flow direction, and an underpressure side opposite the overpressure side having an underpressure surface wall, which is longer in the flow direction. In accordance with a dynamic flow theory, air flows along the longer underpressure side at a higher velocity than along the shorter overpressure side, which is why the static air pressure on the overpressure side is higher than on the underpressure side. In order for the downforce-generating body to achieve a downforce, which is the greatest possible in absolute value, in cooperation with the diffuser system, the overpressure side thereof preferably faces the curved duct bounding surface.

In the activation operating position, at least a substantial portion of the overpressure surface wall extends advantageously in terms of fluid and flow dynamics, parallel to the portion of the curved duct bounding surface disposed oppositely to the overpressure surface wall and spaced therefrom. Thus, between the downforce-generating body and the duct bounding surface, a duct portion having a substantially constant flow cross section is defined, which may contribute to an especially low-vortex flow in the area of the downforce-generating body.

The diffuser system is advantageously not only designed to generate downforce, but to direct the air flowing therethrough on the outlet side, thus, at the downstream longitudinal end thereof, in a desired direction, for instance, in order to utilize the air flow previously used to generate a downforce, subsequently to the outflow thereof out of the diffuser system, for convectively cooling vehicle parts. To this end, in accordance with an advantageous embodiment of the present diffuser system, two lateral bounding surfaces may project from the curved duct bounding surface at a distance from one another, at least one lateral bounding surface being curved about a lateral curvature axis, the lateral curvature axis forming an angle with the diffuser curvature axis. The lateral curvature axis preferably forms a right angle with the diffuser curvature axis. There is no need in this instance for the diffuser curvature axis and the lateral curvature axis to intersect. Rather, they may be skew.

It should also be appreciated that each curvature axis, composed of the diffuser curvature axis and the lateral curvature axis, may be at a different location for different portions of the duct bounding surface, respectively the lateral bounding surface, for instance, when the curvature of a surface changes along the profile thereof in the flow direction.

It is advantageous when the pivot axis encloses an angle of less than 10° with the diffuser curvature axis to achieve a most efficient possible change of location and position of the downforce-generating body relative to the duct bounding surface. The pivot axis is preferably parallel to the diffuser curvature axis. It is, therefore, also preferred that the longitudinal end of the downforce-generating body most proximate to the upstream longitudinal end of the diffuser duct, be parallel to the duct bounding surface, so that, along the entire length thereof to be measured parallel to the pivot axis, it is able to physically contact the duct bounding surface.

The present invention likewise relates to a motor vehicle having a diffusor system as described and further refined above; to generate a greatest possible downforce, the flow direction through the diffuser duct mainly extending in the longitudinal direction of the vehicle. Due to the curved profile of at least the duct bounding surface, locally, the flow direction will also have directional components which differ from the longitudinal direction of the vehicle. Nevertheless, the diffuser system is initially subject to an approach flow in the longitudinal direction of the vehicle, and this flow in said direction is determinative for the effect of the diffuser system over a substantial portion of the extent thereof. The diffuser system is preferably configured as a front diffuser system in an area of the vehicle underbody situated in front of and proximately to a front wheel. The configuration as a front diffuser system is possible due to the requirement of only a single drive and of relatively low required drive forces.

In the preferred specific embodiment mentioned above having a curved lateral bounding surface, an advantageous utilization of the air flowing through the diffuser system in operation provides that there may be a flow discharge from the diffuser system toward the front wheel, in particular toward a brake system located at the front wheel. Thus, once a desired downforce is generated, the air flow may convectively cool a brake disk. These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
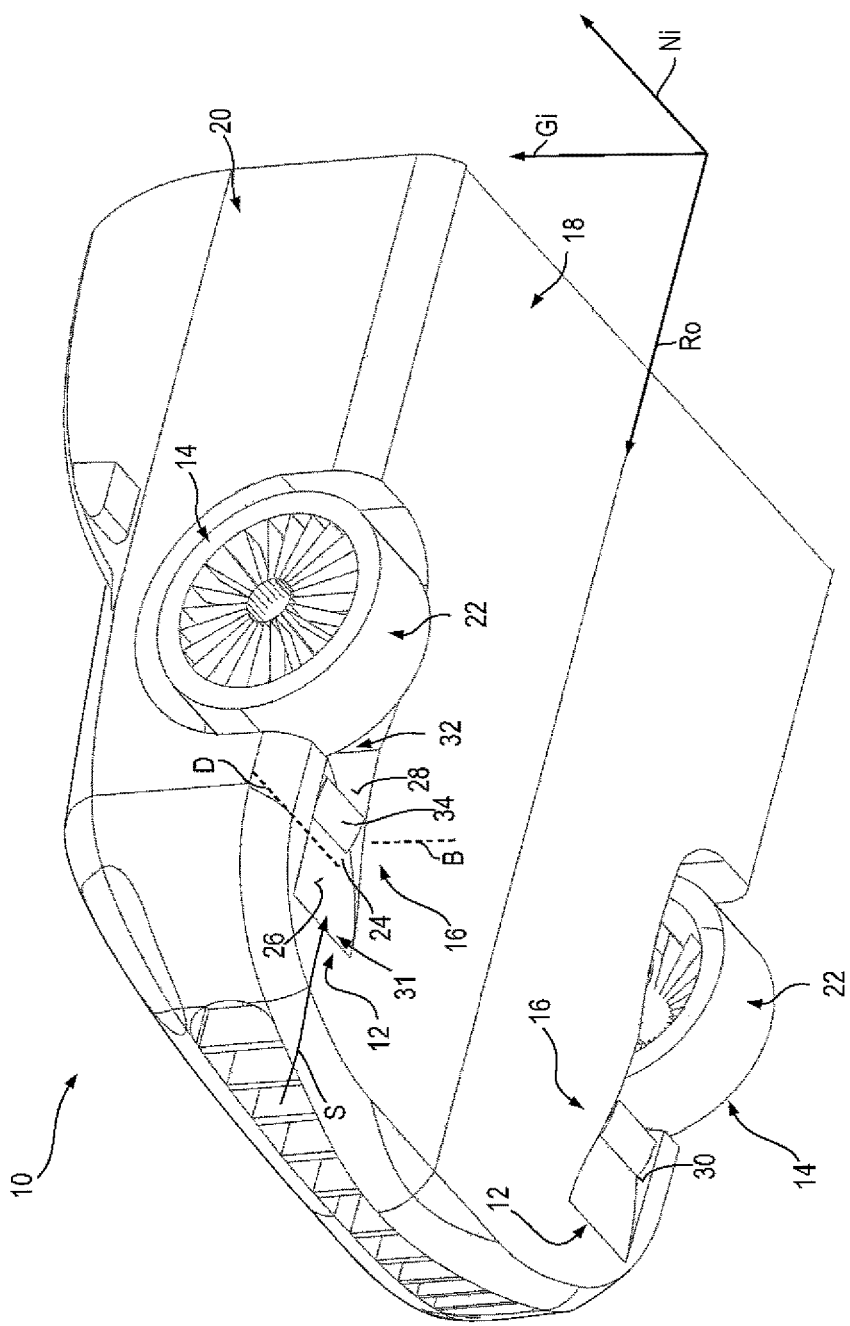
FIG. 1: is a rough schematic bottom view of a vehicle according to the present invention having a diffuser system according to the present invention, the downforce-generating body being in the inactivation operating position.

Referring now to the drawings wherein the showings are for the purpose of illustrating preferred and alternative embodiments of the invention only and not for the purpose of limiting the same, FIG. 1 shows a rough schematic bottom view of a vehicle 10 according to the present invention likewise having an inventive diffuser system 12. More specifically, vehicle 10 has two diffuser systems 12, each of which is associated with a front wheel 14.

FIGS. 1 through 4 show a customary vehicle coordinate system which includes a roll axis Ro, which extends parallel to the longitudinal direction of the vehicle, a yaw axis Gi, which extends parallel to the vertical direction of the vehicle, and a pitch axis Ni, which extends in the transverse direction of the vehicle.

The configuration of diffuser systems 12 is mirror-inverted relative to a plane of symmetry, which includes roll axis Ro and yaw axis Gi and is a vertical longitudinal center plane of vehicle 10. Relative to front wheel 14 most proximate thereto, each of diffuser systems 12 is configured in an area 16 situated in front of front wheel 14 and at least somewhat more proximately to the longitudinal center plane of vehicle 10 than front wheel 14.

Because of the mirror symmetry condition described above, it suffices to describe only one of diffuser systems 12 in detail in the following. The description thereof also holds for respective other diffuser system 12 because of the mentioned mirror symmetry condition.

Vehicle 10 rests on a level contact ground BU (not shown in FIGS. 1 and 2), which is a reference ground (see FIGS. 3 and 4) that extends parallel to vehicle floor 18, however, tangentially to locations 22 of front wheels 14 that project from vehicle floor 18 furthest from vehicle body 20.

Diffuser system 12 defines a diffuser duct 24, which extends essentially along roll axis Ro and is bounded by a curved duct bounding surface 26 along yaw axis Gi to vehicle body 20. Duct bounding surface 26 is curved about a diffuser curvature axis D, which extends parallel to pitch axis Ni, and in such a way that it curves away from the reference ground along flow direction S along which diffuser duct 24 is traversed by flow.

In the direction of pitch axis Ni toward the longitudinal center plane, diffuser duct 24 is bounded by an inner lateral bounding surface 28 and, away from the longitudinal center plane, by an outer lateral bounding surface 30 disposed oppositely to inner lateral bounding surface 28. For a better overview, lateral bounding surfaces 28 and 30 are provided with reference numerals only on those diffuser systems 12 where they are actually also discernible. Inner lateral bounding surface 28 is curved about a lateral curvature axis B, which is orthogonal to diffuser curvature axis D and parallel to yaw axis Gi, to allow air flowing into diffuser duct 24 at upstream longitudinal end 31 and through diffuser duct 24 to flow out at downstream longitudinal end 32 toward associated front wheel 14. In this manner, the air flow exiting diffuser duct 24 may at least partially convectively cool front wheel 14 or/and a brake system accommodated therein.

Pivotally accommodated in diffusor duct 24 relative thereto is a downforce-generating body 34.

Figure 2:
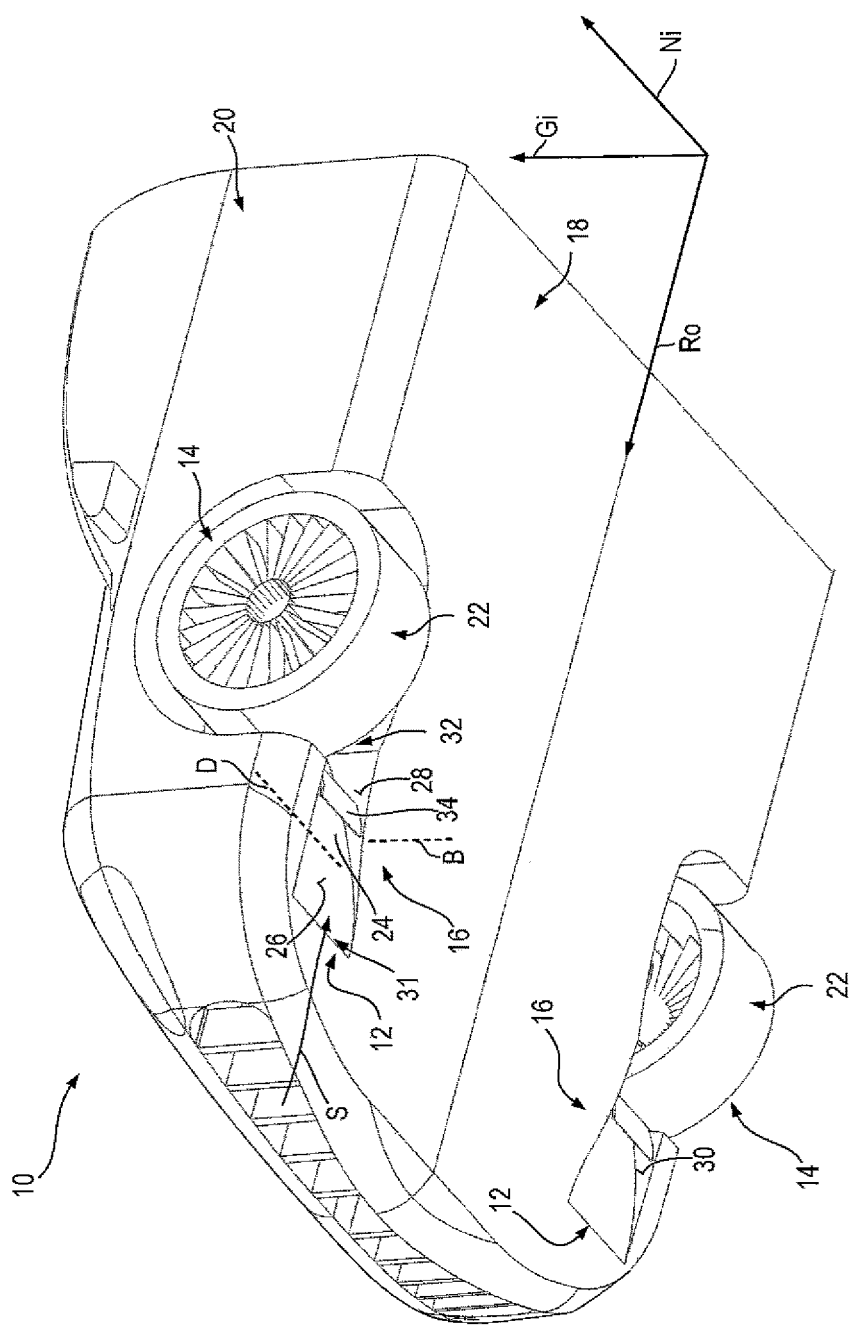
FIG. 2 is the rough schematic bottom view of FIG. 1, the downforce-generating body being in the activation operating position.

FIG. 1 shows downforce-generating body 34 in the inactivation operating position thereof; conversely, FIG. 2 shows it in the activation operating position thereof. The two operating positions are end positions of downforce-generating body 34 beyond which it is not movable in normal diffuser operation.

Figure 3:
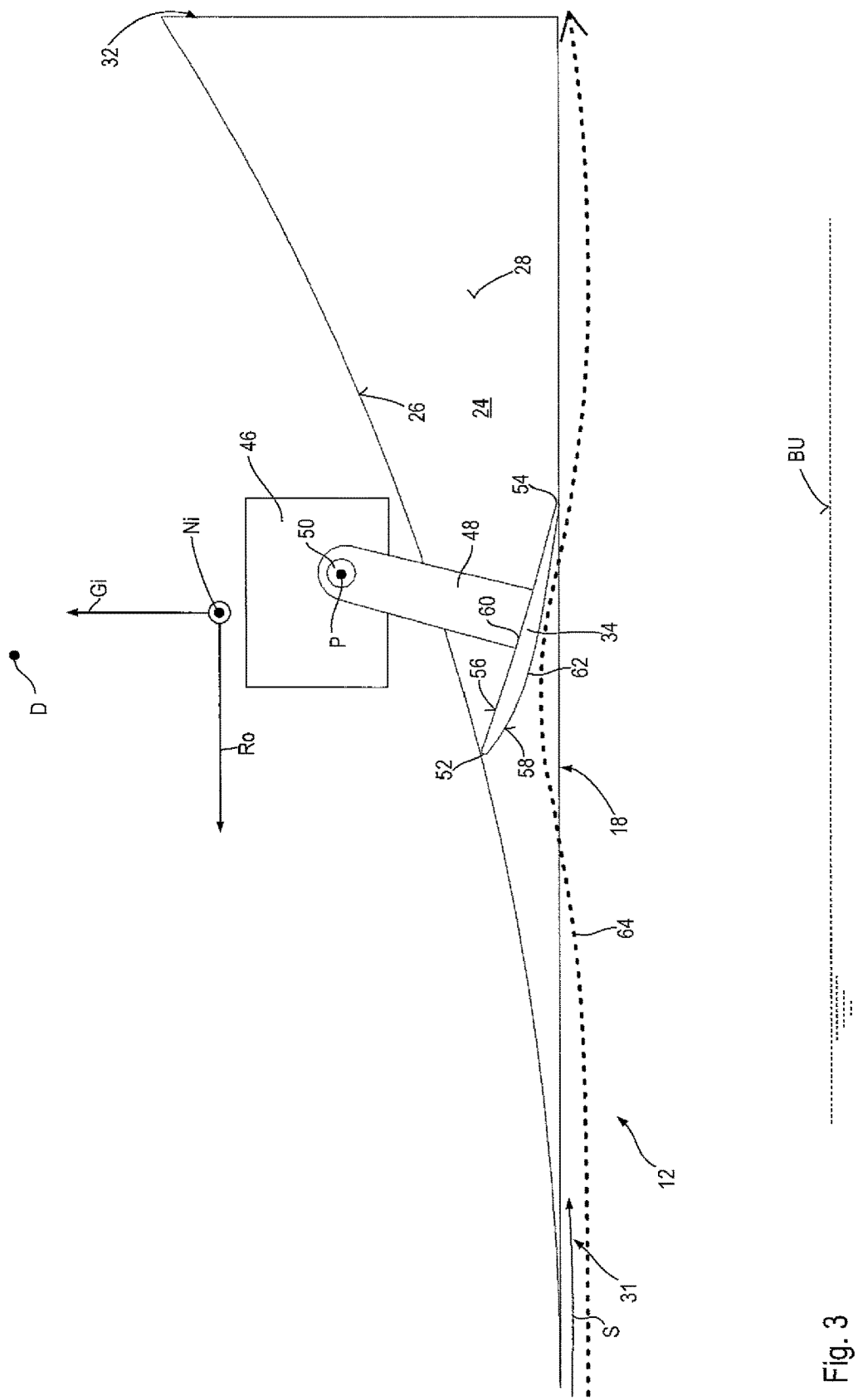
FIG. 3 is a rough schematic lateral view of the diffuser system of FIG. 1 in the inactivation operating position.

FIG. 3 depicts the diffuser system of FIG. 1 in a lateral view along pitch axis Ni, as viewed in the direction of inner lateral bounding surface 28. Diffuser curvature axis D is orthogonal to the drawing plane of FIG. 3. In FIG. 3, it is shown more proximately to duct bounding surface 26 than would be indicated by the curvature thereof. Similarly, FIG. 3 shows the reference ground in dashed lines as a plane that is orthogonal to the drawing plane of FIG. 3 and denoted by reference numerals BU. In the sketch, reference ground BU is more proximate to diffuser system 12 than corresponds to the actual distance.

Downforce-generating body 34 is pivotable about a pivot axis P parallel to pitch axis Ni between the mentioned operating positions. The pivotability about pivot axis P is the only movability of downforce-generating body 34 relative to duct bounding surface 26 in normal diffuser operation.

To provide pivoting movement about pivot axis P, downforce-generating body 34 is driven by a pivot drive 46. Pivot drive 46 is advantageously located on the side of duct bounding surface 26, respectively of the component featuring the same, that faces away from reference ground BU. The component featuring duct bounding surface 26, respectively vehicle floor 18 thereby shields pivot drive 46 from reference ground BU. A connector bar 48 connects downforce-generating body 34 to an output shaft 50 of pivot drive 46. To achieve greater stability, a connector bar 48 is configured at each of the two longitudinal ends of downforce-generating body 34, connecting it in a rocking-type manner to output shaft 50 of pivot drive 46.

Downforce-generating body 34 has a leading edge 52, which is more proximate to upstream longitudinal end 31 of diffuser duct 24, and a trailing edge 54, which is more proximate to downstream longitudinal end 32. In sectional planes disposed orthogonally to pivot axis P, downforce-generating body 34 features a profile shape which generates aerodynamic downforce in response to approach flow. In the exemplary embodiment, this is shown exemplarily as an airfoil form having an overpressure side 56 and an opposite underpressure side 58. Overpressure side 56 is formed by a overpressure surface wall 60 which connects leading edge 52 to trailing edge 54. Underpressure side 58 is formed by an opposite connecting surface 62, which likewise connects leading edge 52 to trailing edge 54, but has a greater length in flow direction S. The greater length is achieved by a pronounced convex curvature of connecting surface 62. Overpressure surface wall 60 of overpressure side 56 preferably has a slightly concave form.

In the inactivation operating position shown in FIG. 3, downforce-generating body 34 rests by leading edge 52 thereof against curved duct bounding surface 26, so that air flowing along duct bounding surface 26 does not flow completely through diffuser duct 24, rather reaches underpressure side 58 of downforce-generating body 34 and is deflected by the same. The approaching air flows along downforce-generating body 34 to trailing edge 54 and breaks away there. It then continues to flow as an uninterrupted jet essentially parallel to roll axis Ro. An exemplary flow thread 64 illustrated by a dashed line indicates an approximate path of the air flow along diffuser system 12 when downforce-generating body 34, as illustrated in FIG. 3, is in the inactivation operating position. Diffuser system 12, in fact, does not generate any appreciable downforce then, which is the actual purpose thereof, however, also does not generate any appreciable drag, which otherwise is the consequence, respectively side effect of the downforce generated by diffuser system 12.

In driving situations where diffuser system 12 does not require downforce or additional downforce, downforce-generating body 34 is adjusted into the inactivation operating position, in which vehicle 10 may be moved without additional drag caused by diffuser system 12.

Figure 4:
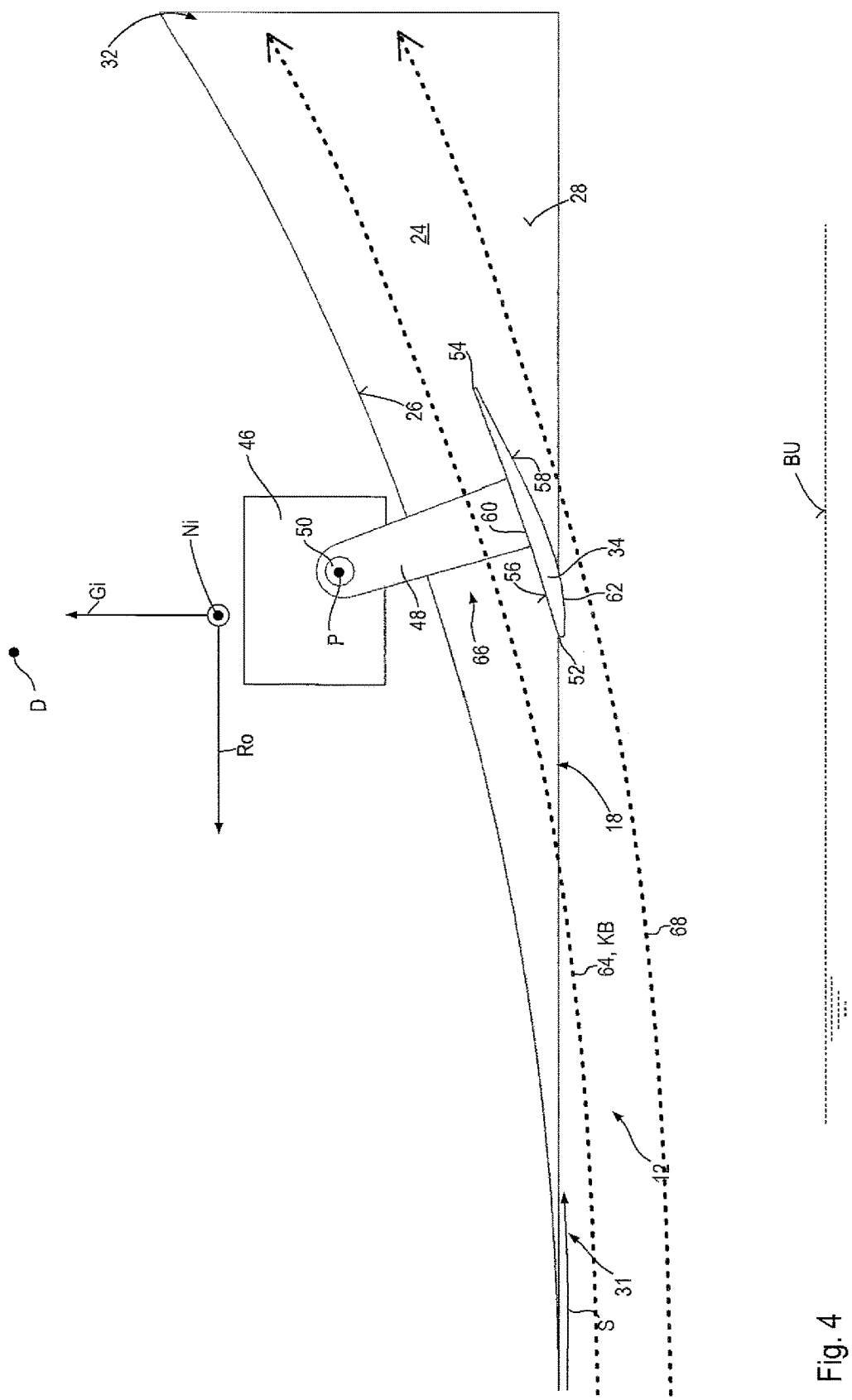
FIG. 4 is a rough schematic lateral view of the diffuser system of FIG. 2 in the activation operating position.

However, when diffuser system 12 is to generate the greatest possible downforce, for instance, in a high-speed sporty driving style, for example, on a racetrack, pivot drive 46 moves downforce-generating body 34 into the activation operating position shown in FIGS. 2 and 4, in which diffuser system 12 is activated to generate a downforce.

Downforce-generating body 34 is then located at a distance from the convex side of curved duct bounding surface 26, forming a gap 66. In the activation operating position, overpressure surface wall 60 on overpressure side 56 of downforce-generating body 34 extends parallel to the portion of duct bounding surface 26 thereof disposed oppositely thereto across gap 66.

In the activation operating position, air may flow along curved duct bounding surface 26, whereby diffuser system 12 is capable of generating a downforce in accordance with the intended purpose. This is indicated by flow thread 64 in FIG. 4.

In addition, in the activation operating position, downforce-generating body 34 is circumflowed by air, which is why it produces a force directed from overpressure side 56 to underpressure side 58, which, transmitted via connector bars 48 to vehicle 10, increases the downforce generated by diffuser system 12 in absolute value. Flow thread 68 in FIG. 4, together with flow thread 64, indicates circumflow around downforce-generating body 34 on both sides.

Flow thread 64 in FIG. 4 extends along a virtual duct path KB along which diffuser duct 24 extends.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A diffuser system for a motor vehicle, comprising a diffuser duct, which extends along a virtual duct path and is traversable by flow in a flow direction, having at least one duct bounding surface, which is curved about a diffuser curvature axis, the diffuser curvature axis forming an angle with the duct path, and comprising a downforce-generating body, which can pivot between two operating positions about a pivot axis, which forms an angle with the duct path; in a cross-sectional plane which is orthogonal to the pivot axis, the downforce-generating body having a form which generates downforce in response to approach flow; in an activation operating position, a leading edge of the downforce-generating body, which is more proximate to the upstream longitudinal end of the diffuser duct, being at a greater distance from the curved duct bounding surface than in an inactivation operating position, which differs from the activation operating position, wherein the pivot axis extends outside of the downforce-generating body.

2. The diffuser system as recited in claim 1, wherein the pivot axis extends outside of the diffuser duct.

3. The diffuser system as recited in claim 2, wherein the pivotability of the downforce-generating body about the pivot axis is the only movability of the downforce-generating body relative to the diffuser duct.

4. The diffuser system as recited in claim 1, wherein the pivotability of the downforce-generating body about the pivot axis is the only movability of the downforce-generating body relative to the diffuser duct.

5. The diffuser system as recited in claim 1, wherein in the inactivation operating position, the downforce-generating body rests by the longitudinal end region thereof, which is most proximate to the upstream longitudinal end of the diffuser duct, against the curved duct bounding surface.

6. The diffuser system as recited in claim 3, wherein in the inactivation operating position, the downforce-generating body rests by the longitudinal end region thereof, which is most proximate to the upstream longitudinal end of the diffuser duct, against the curved duct bounding surface.

7. The diffuser system as recited in claim 6, wherein, due to the aerodynamically downflow-generating form thereof, in particular the airfoil profile thereof, which aerodynamically generates downflow in response to approach flow, between the leading edge thereof, which is more proximate to the upstream longitudinal end of the diffuser duct and the trailing edge thereof, which is more proximate to the downstream longitudinal end of the diffuser duct, the downforce-generating body, as a profile body, has an overpressure side having an overpressure surface wall, which is shorter in the flow direction, and an underpressure side opposite the overpressure side having an underpressure surface wall, which is longer in the flow direction, the overpressure side facing the curved duct bounding surface.

8. The diffuser system as recited in claim 1, wherein, due to the aerodynamically downflow-generating form thereof, in particular the airfoil profile thereof, which aerodynamically generates downflow in response to approach flow, between the leading edge thereof, which is more proximate to the upstream longitudinal end of the diffuser duct and the trailing edge thereof, which is more proximate to the downstream longitudinal end of the diffuser duct, the downforce-generating body, as a profile body, has an overpressure side having an overpressure surface wall, which is shorter in the flow direction, and an underpressure side opposite the overpressure side having an underpressure surface wall, which is longer in the flow direction, the overpressure side facing the curved duct bounding surface.

9. The diffuser system as recited in claim 8, wherein, in the activation operating position, at least a major portion of the overpressure surface wall extends parallel to the curved duct bounding surface disposed oppositely to the overpressure surface wall and spaced therefrom.

10. The diffuser system as recited in claim 7, wherein, in the activation operating position, at least a major portion of the overpressure surface wall extends parallel to the curved duct bounding surface disposed oppositely to the overpressure surface wall and spaced therefrom.

11. The diffuser system as recited in claim 1, wherein two lateral bounding surfaces project from the curved duct bounding surface at a distance from one another, at least one lateral bounding surface being curved about a lateral curvature axis, the lateral curvature axis forming an angle with the diffuser curvature axis.

12. The diffuser system as recited in claim 1, wherein the pivot axis forms an angle of less than 10° with the diffuser curvature axis.

13. The diffuser system as recited in claim 3, wherein the pivot axis forms an angle of less than 10° with the diffuser curvature axis.

14. The diffuser system as recited in claim 1, wherein the pivot axis is parallel to the diffuser curvature axis.

15. The diffuser system as recited in claim 3, wherein the pivot axis is parallel to the diffuser curvature axis.

16. A vehicle comprising a diffuser system according to claim 1, wherein the flow direction extends predominantly in the longitudinal direction of the vehicle, the diffuser system being configured as a front diffuser system in an area of the vehicle underbody situated in front of and proximately to a front wheel.

17. The vehicle as recited in claim 16, wherein the diffuser system includes two lateral bounding surfaces that project from the curved duct bounding surface at a distance from one another, at least one lateral bounding surface being curved about a lateral curvature axis, the lateral curvature axis forming an angle with the diffuser curvature axis and wherein a flow discharge takes place from the diffuser system towards the front wheel, in particular towards a brake system located at the front wheel.

* * * * *